Dec. 5, 1944.          F. W. SIDE          2,364,483
                  MEASURING APPARATUS
           Filed March 19, 1942     2 Sheets-Sheet 1

INVENTOR.
FREDERICK W. SIDE
BY *CBSpangenberg*
ATTORNEY.

Dec. 5, 1944.   F. W. SIDE.   2,364,483
MEASURING APPARATUS
Filed March 19, 1942   2 Sheets-Sheet 2

INVENTOR.
FREDERICK W. SIDE
BY C. B. Spangenberg
ATTORNEY.

Patented Dec. 5, 1944

2,364,483

UNITED STATES PATENT OFFICE 2,364,483

MEASURING APPARATUS

Frederick W. Side, Philadelphia, Pa., assignor to The Brown Instrument Company, Philadelphia, Pa., a corporation of Pennsylvania Application March 19, 1942, Serial No. 435,397

8 Claims. (Cl. 172—239)

The present invention relates to improved apparatus for measuring and/or utilizing for control and analogous purposes minute direct currents such as those resulting from the voltage variations of thermocouples or photovoltaic cells.

An object of the invention is to provide novel and effective means for converting a minute direct current into an alternating current which may be readily amplified for measurement, control, and other purposes.

Another object of the invention is to provide an improved arrangement for deriving an alternating current from a direct current source of electromotive force which is characterized by the simplicity and effectiveness of the apparatus required, and in particular, by the fact that it does not include, nor require, any physically movable parts.

A further object of the invention is to effect a novel and desirable combination of means for converting direct current into alternating current with potentiometric measuring apparatus to thereby produce a novel and relatively simple form of self balancing potentiometer instrument which may follow the approved practices of the art in respect to many of its features.

In one embodiment of the present invention I utilize the source of minute direct electromotive force under measurement to create a pulsating current of regular frequency by connecting the source of electromotive force in circuit with a resistive element having an appreciable temperature coefficient of resistance and thus varying in resistance in accordance with the temperature thereof and heating the resistance with suitable regularity and frequency by means advantageously consisting of a heater filament disposed closely adjacent the resistive element and energized by an electrical current pulsating or fluctuating at the frequency it is desired to vary the resistance of the resistive element. In accordance with the present invention it is contemplated to so arrange the heater filament and the resistive element that the flow of pulsating or fluctuating current through the heater filament is prevented from passing through the resistive element and thereby adversely affecting the operation of the apparatus. The subjection of the resistive element to a source of heat varying in temperature at the frequency of the pulsating or fluctuating current applied to the heater filament produces variations in the conductivity of the resistive element of the same frequency as that of the pulsating or fluctuating current.

Such variations in conductivity of the resistive element causes pulsations in the current flow in the circuit including the direct current source under measurement and the resistive element. The pulsating current thus created is translated by suitable inductive resistance or other apparatus such as an ordinary transformer into an alternating current which may be amplified by use of an electronic amplifier and utilized for the purpose of controlling the selective actuation of relatively rugged relays or a reversible electrical motor.

Since the pulsating or fluctuating current flow through the heater filament which is utilized for producing the temperature variations of the resistive element is prevented from passing through the latter, the operation of the amplifier and the apparatus controlled thereby is independent of the pulsating or fluctuating flow through the heater filament and responds only to variations in the small direct current under measurement.

In a preferred embodiment of the invention two heater filaments are provided for producing the temperature variations of the resistive element and are so arranged as to neutralize the effects of inductive coupling between the heater filaments and the resistive element to thereby prevent the induction of pulsating or fluctuating currents in the resistive element from the heater filament circuit.

The various features of novelty which characterize my present invention are pointed out with particularity in the claims annexed to and forming a part of this specification. For a better understanding of the invention, however, its advantages and the specific objects obtained with its use, reference should be had to the accompanying drawings and descriptive matter in which are illustrated and described preferred embodiments of the invention.

Figure 1:
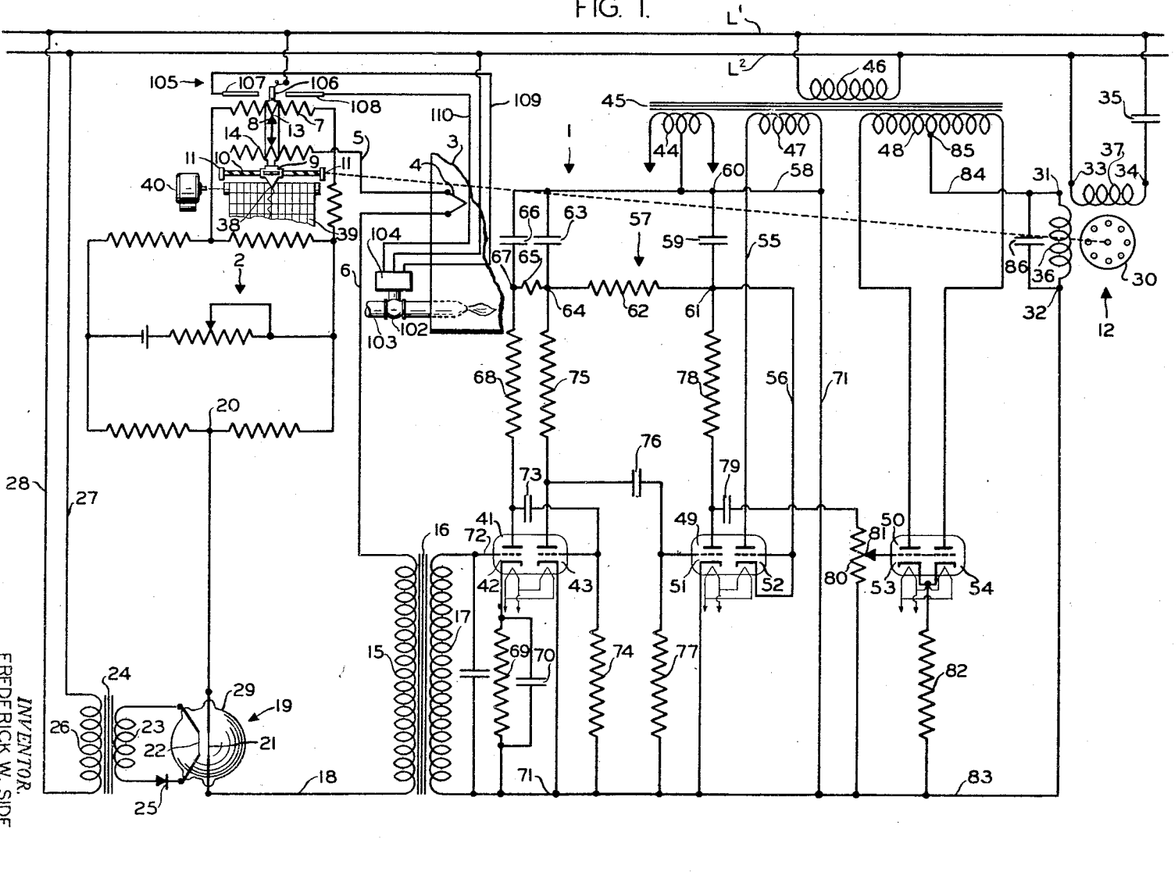
Fig. 1 is a diagrammatic representation of one embodiment of the present invention.

Referring to Fig. 1 of the drawings there is illustrated in schematic form an electronic device generally indicated by the reference character 1 for producing effects in accordance with the extent of unbalance of a potentiometric measuring circuit 2 which controls the operation of the electronic device 1. The potentiometric circuit 2 is unbalanced in accordance with the variations in a quantity to be measured and because of the small magnitude of the unbalanced electromotive forces produced in the potentiometric circuit it is not practicable nor desirable to have the said effects produced directly by the potentiometric circuit. Specifically, an arrangement is illustrated in the drawings for measuring and recording the temperature within a furnace 3 in the interior of which a thermocouple 4 is arranged so as to be responsive to slight changes in the temperature within the furnace. The thermocouple 4, which may be located at a distance from the remainder of the potentiometric circuit, has its terminals connected by a pair of conductors 5 and 6 to the terminals of the potentiometric measuring circuit 2. The potentiometric measuring circuit 2 is preferably of the null point type and includes a slidewire resistance 7 and an associated contact 8 which is adapted to be moved along the length of the slidewire resistance. The potentiometric measuring circuit 2 illustrated schematically in the drawings may be of any suitable type such as the Brown potentiometric measuring circuit disclosed in Patent 2,150,502 issued to Thomas R. Harrison, E. H. Grauel and J. E. Kessler on March 16, 1939.

The movable contact 8 is mechanically connected to a suitable carrier which, for example, may be in the form of an internally threaded nut 9 which is adapted to ride on a screw threaded rod 10 which, in turn, is supported by suitable bearings 11 and is rotated in one direction or the other under control of the thermocouple 4. A reversible electrical motor generally designated by the reference character 12 is mechanically coupled in any convenient manner to the screw threaded rod 10 to rotate the latter at the desired speed and in the desired direction to thereby move the contact 8 along the slidewire resistance 7 to rebalance the potentiometric measuring circuit 2 whenever the latter is unbalanced in response to a change in electromotive force produced by the thermocouple 4.

The contact 8 is a bridging contact connecting the point 13 on the slidewire resistance 7 to a corresponding point on a slidewire resistance 14 which is arranged alongside the resistance 7. The resistance 14 has one end connected by the conductor 5 to one terminal of the thermocouple 4 and is employed for the purpose of avoiding measurement inaccuracies due to variations in resistance to the flow of current generated by the thermocouple 4 which would otherwise result from variations in the relative resistances of the portions of the resistance 7 at opposite sides of the point 13. The other terminal of the thermocouple 4 is connected by means of the conductor 6 to one terminal of the primary winding 15 of an iron core transformer 16 having a secondary winding 17. The other terminal of the transformer primary winding 15 is connected by a conductor 18, in which a resistive device indicated generally by the reference numeral 19 is inserted, to the terminal of the potentiometric measuring circuit which has been indicated by the reference numeral 20.

The unbalanced electromotive forces which are produced in the potentiometric measuring circuit 2 upon variations in the electromotive force developed by the thermocouple 4 are impressed on the circuit including the transformer primary winding 15 and the resistive device 19. The circuit including transformer primary winding 15 and the resistive device 19 is utilized for the purpose of converting the potentiometric unbalanced direct currents into pulsating currents which are translated by the transformer 16 into an alternating current of one phase or of opposite phase depending upon the polarity of the unbalanced direct currents derived from the potentiometer.

To this end the resistive device 19 includes an elongated filament 21 which is composed of a material having an appreciable temperature coefficient of resistance. Because of this property of the filament 21 the resistance of the filament 21 varies with the temperature thereof. That is to say, when the filament 21 has a positive temperature coefficient of resistance and its temperature is increased, the resistance of the filament increases correspondingly, and consequently, the current flow through the filament decreases. Similarly, upon a decrease in the temperature of the filment 21 the resistance of the filament is decreased whereupon the current flow through the filament increases. The filament 21 may be composed of nickel wire which has a positive temperature coefficient of resistance, or if desired, the filament 21 may be composed of a material such as carbon ribbon so as to exhibit a negative temperature coefficient of resistance. The filament 21 is desirably so constructed that its mass is sufficiently small to permit rapid temperature and consequently resistance variations thereof, for example, of the order of 60 cycles per second. If desired, the filament 21 may be constructed in the form of a coiled spring instead of in the form of a stretched wire, as shown.

This characteristic of the filament 21 of the resistive device 19 is utilized in accordance with the present invention for the purpose of periodically increasing and decreasing the resistance of the circuit path through which the unbalanced potentiometric direct currents flow and thereby for creating a pulsating direct current flow through the transformer primary winding 15, which pulsating direct current flow is converted by the transformer 16 into an alternating current of one phase or of opposite phase depending upon the direction of the current flow from the potentiometric circuit 2 through the transformer primary winding 15.

Such alternate increase and decrease in the resistance of the filament 21 is effected by subjecting the filament 21 to a source of heat the temperature of which fluctuates at the frequency it is desired to impart to the alternating current induced in the transformer secondary winding 17. The source of heat referred to is derived from an elongated heater filament 22 which is disposed closely adjacent the filament 21 and is connected to the terminals of the secondary winding 23 of a transformer 24 through a half wave rectifier 25. When a filament 21 in the form of a coiled spring is employed, the heater filament 22 may also desirably be configured in the form of a coiled spring and arranged so as to encircle the filament 21. The transformer 24 also includes a line voltage primary winding 26 which is connected by conductors 27 and 28 to alternating current supply conductors $L^1$ and $L^2$. The half wave rectifier 25 connected in the circuit between the transformer secondary winding 23 and the heater filament 22 may be of the copper oxide type and permits a pulse of current to flow through the heater filament 22 only during alternate half cycles of the alternating current supplied by the supply conductors $L^1$ and $L^2$. These pulses of current through the heater filament 22 operate to periodically raise the temperature of the heater filament 22 at the frequency of the pulsating current flows therethrough and thereby at the frequency of the alternating current supplied by conductors $L^1$ and $L^2$.

To permit efficient translation of the changes in electrical energy through the heater filament 22 into corresponding changes in heat energy in the heater filament 22, the latter is preferably so composed as to have a small mass whereby the temperature variations of the filament 22 closely follow the variations in electrical current through the filament. The heat energy radiating from the heater filament 22 and also conducted therefrom by the surrounding atmosphere to the filament 21 tend to vary the temperature of the latter in correspondence with the temperature fluctuations of the filament 22. In order to enhance such transfer of heat energy from the heater filament 22 to the filament 21, the two filaments 21 and 22 may desirably be enclosed within a suitable container 29 which may be filled with a gas having a high thermal conductivity. In addition, the conducting leads from the filament 21 to the exterior of the container 29 and the conducting leads from the heater filament 22 to the exterior of the container 29 may desirably be of heavy cross-section, as shown, and of a material having a high thermal conductivity so as to facilitate the conduction of heat from the filaments 21 and 22 away from the latter. This accomplishes the attainment of a wide variation in temperature of the filament 21 and thereby a wide variation in the resistance of said filament. Consequently, more efficient conversion of the unbalanced direct current flows through the transformer primary winding 15 and the filament 21 into an alternating current in the transformer secondary winding 17 is made possible.

With the arrangement described the flow and direction of flow of current through the circuit from the point 20 of the potentiometric circuit 2 through the filament 21, the transformer primary winding 15 and the thermocouple 4 to the point 13 of the potentiometric measuring circuit 2 depends upon the relation between the electromotive force produced by the thermocouple 4 and the potential difference between the potentiometric circuit points 13 and 20. The thermocouple 4 is so connected to the potentiometric measuring circuit that the electromotive force of the thermocouple opposes the potential difference between the points 13 and 20. The potential difference between the points is increased and decreased by movement of the contact 8 to the right and to the left, respectively.

With suitable adjustments of the contact 8 the potential difference between the points 13 and 20 will be equal and opposite to the electromotive force produced by the thermocouple 4 and no current will flow through the circuit including the transformer primary winding 15 and the filament 21. On an increase in the thermocouple electromotive force above the potential difference between the points 13 and 20, current will flow in one direction through the circuit including the transformer primary winding 15 and the filament 21, and such current flow may then be eliminated by a suitable adjustment of the contact 8 to the right. Conversely, when the electromotive force of the thermocouple 4 falls below the potential difference between the potentiometric circuit points 13 and 20, the resultant current flow through the transformer primary winding 15 and the filament 21 will be in such a direction as to be eliminated by a suitable adjustment of the contact 8 to the left.

As is illustrated more or less diagrammatically in the drawings, the bridging contact 8 is adjusted along the slidewire resistance 7 by the operation of the reversible electrical motor 12 which is shown as having its rotor 30 mechanically coupled to the threaded shaft 10. The reversible electrical motor 12 has a pair of terminals 31 and 32 which are connected to the output circuit of the electronic device 1 and also has a pair of terminals 33 and 34 which are connected through a condenser 35 of suitable value to the alternating current supply conductors $L^1$ and $L^2$.

For its intended use the motor 12 may be of the form schematically shown in the drawings and comprising a rotor 30 and two pairs of oppositely disposed field poles (not shown) on one pair of which the winding 36 is wound and on the other pair of which the winding 37 is wound. The winding 37 has its terminals connected to the motor terminals 33 and 34 and is supplied with energizing current from the alternating supply conductors $L^1$ and $L^2$ through the condenser 35. Due to the action of the condenser 35 the current which flows through the motor winding 37 will lead the voltage of the alternating current supply conductors $L^1$ and $L^2$ by approximately 90°.

The current supplied to the winding 36 of the motor 12 by the electronic device 1 is approximately in phase with or displaced 180° with respect to the voltage of the alternating current supply conductors $L^1$ and $L^2$ and establishes a field in the rotor 30 which is displaced approximately 90° in one direction or the other with respect to that established therein by the winding 37. Reaction between the field set up by the winding 36 with that set up by the winding 37 establishes a rotating field in the rotor 30 which rotates in one direction or the other depending upon whether the winding 36 is energized with current in phase with the voltage of the alternating current supply conductors $L^1$ and $L^2$ or displaced 180° in phase therewith.

The direction and duration of rotation of the motor 12 is controlled in accordance with the direction and extent of unbalance of the potentiometric measuring circuit 2 so that upon rotation of the motor 12 the contact 8 is adjusted in the proper direction to rebalance the potentiometric measuring circuit 2. If desired, a pen 38 may be mounted on the carriage 9 which carries the contact 8 and may be arranged in cooperative relation with a recorder chart 39 to thereby provide a continuous record of the temperature to which the thermocouple 4 is subjected. The chart 39 may be a strip chart, as shown, and is adapted to be driven in any convenient manner as for example, by a unidirectional electrical motor 40 through suitable gearing (not shown) so that a record of the temperature to which the thermocouple 4 is subjected will be recorded as a continuous line on the chart 39.

Fundamentally, the circuit through which the unbalanced potentiometer currents flow and in which the transformer primary winding 15 and the filament 21 are connected is a switching mechanism, the heater filament 22 operating to periodically vary the resistance of the filament 21. For purposes of illustration it may be assumed that the resistance of the filament 21 is increased during the first half cycle of the alternating voltage supplied by the supply conductors $L^1$ and $L^2$, for example, when the lower terminal of the transformer secondary winding 23 is positive with respect to the upper terminal thereof.

When the potentiometric measuring circuit 2 is balanced, no current flows in the circuit between the potentiometric circuit points 13 and 20. When the temperature to which the thermocouple 4 is subjected increases, the unbalanced direct current in the potentiometric measuring circuit flows in the direction from the potentiometric measuring circuit point 13 to the conductor 5, thermocouple 4, conductor 6, the transformer primary winding 15, conductor 18, and filament 21 to the potentiometer circuit point 20. When the temperature to which the thermocouple 4 is subjected decreases, the unbalanced direct current in the potentiometric circuit flows in the opposite direction through the circuit path just traced, namely, from the potentiometric circuit point 20 to the potentiometric circuit point 13.

When the temperature to which the thermocouple 4 is subjected increases, the pulsating current flow through the transformer primary winding 15 created by the resistance variations of the filament 21 are of the proper phase and frequency to induce an alternating current in the transformer secondary winding 17 which is in phase with the alternating voltage of the supply lines $L^1$ and $L^2$ and also is of the same frequency. Upon a decrease in the temperature to which the thermocouple 4 is subjected, the unbalanced potentiometric direct currents flow from the potentiometric circuit point 20 to the point 13. Under this condition the pulsating current flows through the transformer primary winding 15 created by the resistance variations of the filament 21 are also of the same frequency as the frequency of the alternating current supply lines $L^1$ and $L^2$ but are of the opposite polarity so that the phase of alternating current induced in the transformer secondary winding 17 is opposite that of the alternating current supply lines $L^1$ and $L^2$.

Summing up, when the potentiometric measuring circuit 2 is balanced, there is no current flow through the transformer primary winding 15, and therefore, no voltage is induced in the transformer secondary winding 17. Upon an increase in the temperature to which the thermocouple 4 is subjected, the pulsations in the flow of potentiometric unbalanced current produced in the transformer primary winding 15 by the variations in resistance of the filament 21 operate to cause the induction of an alternating voltage in the transformer secondary winding 17 which is in phase with the alternating voltage supplied by the alternating current supply conductors $L^1$ and $L^2$. Conversely, upon a decrease in the temperature to which the thermocouple 4 is subjected, the pulsations in the potentiometric unbalanced direct current through the transformer primary winding 15 causes the induction of an alternating voltage in the transformer secondary winding 17 which is approximately 180° out of phase with the alternating voltage supplied by the alternating current supply conductors $L^1$ and $L^2$.

The alternating voltage derived in the transformer secondary winding 17 is amplified by the electronic device 1 and the amplified quantity is utilized for the purpose of energizing the phase winding 36 of the motor 12 for controlling the selective actuation of the latter for rotation in one direction or the other. The electronic device 1 includes an electronic tube 41 to the input circuit of which the alternating voltage induced in the transformer secondary winding 17 is applied. The electronic tube 41 includes two heater type triodes, which have been designated by the reference numerals 42 and 43, within the same envelope. The triode 43 includes anode, control electrode, cathode, and heater filament elements, and the triode 43 also includes like elements. The filaments of the triodes 42 and 43 are connected in parallel and receive energizing current from the low voltage secondary winding 44 of a transformer 45 having a line voltage primary winding 46, and high voltage secondary windings 47 and 48. The conductors to the heater filaments of the electronic tube 41 have not been shown in order not to confuse the drawings. The primary winding 46 of the transformer 45 is connected to and receives energizing current from the alternating current supply conductors $L^1$ and $L^2$.

The transformer secondary winding 44 is also connected by means of conductors (not shown) to the heater filaments of a pair of electronic tubes 49 and 50. The electronic tube 49 includes two heater type triodes, designated by the reference characters 51 and 52, within the same envelope. Both of the triodes of tube 49 include anode, control electrode, cathode, and heater filament elements. The electronic tube 50 also includes two heater type triodes, which have been designated by the reference characters 53 and 54, within the same envelope. The triodes 53 and 54 each include anode, control electrode, cathode, and heater filament elements.

The triode 52 of the electronic valve 49 is utilized as a half wave rectifier to provide a source of direct current voltage for energizing the anode or output circuits of the triodes 42, 43 and 51. As shown, the control electrode and cathode of the triode 52 are directly connected to each other and the output circuit thereof is energized by the transformer secondary winding 47 through a circuit which may be traced from the left end terminal of the winding 47, as seen in the drawings, through the conductor 55 to the anode of the triode 52, the cathode thereof, and through a conductor 56 to the positive terminal of a filter generally designated by the reference numeral 57. The negative terminal of filter 57 is connected by a conductor 58 to the right end terminal of the transformer secondary winding 47.

The filter 57 includes a condenser 59 which operates to smooth out the ripple in the output voltage of the filter between the points 60 and 61. The filter 57 also includes a resistance 62 and a condenser 63 which operate to smooth out the output voltage of the filter between the points 60 and 64. The filter 57 includes a further resistance 65 and a condenser 66 for smoothing out the output voltage between the filter points 60 and 67. The filter, therefore, comprises three stages. Such a three-stage filter is provided because for satisfactory and efficient operation it is desirable that the anode voltage supplied to the triode 42 be substantially free from ripple whereas it is not necessary to supply anode voltage so completely free from ripple to the output circuit of the triode 43. Likewise it is not necessary to supply anode voltage as free from ripple to the triode 51 as it is to the triode 43.

The anode circuit of the triode 42 may be traced from the filter point 67, which comprises the positive terminal of the filter, through a fixed resistance 68 to the anode of the triode 42, to the cathode thereof, and through a cathode biasing resistance 69, which is shunted by a condenser 70, to the negative filter point 60 through a conductor 71. The cathode biasing resistance 69 and the parallel connected condenser 70 are utilized for biasing the control electrode of the triode 42 negatively with respect to the cathode.

The input circuit of the triode 42 may be traced from the cathode to the parallel connected resistance 69 and condenser 70 through the transformer secondary winding 17, and a conductor 72 to the control electrode of the triode 42.

The output circuit of the triode 42 is resistance capacity coupled to the input circuit of the triode 43 by means of a condenser 73 and a resistance 74. More particularly, the anode of the triode 41 is connected by condenser 73 to the control electrode of the triode 43 and the control electrode of the triode 43 is connected through the resistance 74 to the conductor 71 and thereby to the cathode of the triode 43. The anode circuit of the triode 43 may be traced from the positive terminal 64 of the filter 57 through a fixed resistance 75 to the anode of the triode 43, the cathode thereof, and conductor 71 to the negative terminal 60 of the filter.

The output circuit of the triode 43 is resistance capacity coupled to the input circuit of the triode 51 by means of a condenser 76 which is connected between the anode of the triode 43 and the control electrode of the triode 51, and by means of a resistance 77 which is connected between the control electrode of the triode 51 and the cathode thereof. It is noted the resistances 74 and 77 which are connected in the input circuits of the triodes 43 and 51, respectively, operate to maintain the control electrodes of the triodes 43 and 51 at the same potential as their associated cathodes when no voltage is induced in the transformer secondary winding 17, and upon the induction of an alternating voltage in the secondary winding 17, resistances 74 and 77 permit the flow of grid current between the control electrodes of of the triodes 43 and 51 and their associated cathodes and thereby limit the extent the control electrodes of the triodes are permitted to go positive with respect to their associated cathodes.

The anode circuit of the triode 51 may be traced from the positive terminal 61 of the filter 57 through a fixed resistance 78 to the anode of the triode, the cathode thereof, and conductor 71 to the negative terminal 60 of the filter. The output circuit of the triode 51 is resistance capacity coupled by means of a condenser 79 and a resistance 80 to the input circuits of the triodes 53 and 54. As illustrated, a contact 81 which is in adjustable engagement with the resistance 80 is provided for varying the point of connection of the control electrodes of the valves 53 and 54 to the resistance 80. The resistance 80 and contact 81 perform a dual function, namely, to limit the extent to which the control electrodes of the triodes 53 and 54 may be driven positive with respect to their associated cathodes, and also to vary the proportion of the signal impressed upon the control electrodes of triodes 53 and 54 from the output circuit of the triode 51. It will be noted that the signal voltage from the output circuit of the triode 51 is impressed simultaneously and equally on both of the control electrodes of the triodes 53 and 54.

Anode voltage is supplied the output circuits of the triodes 53 and 54 from the high voltage secondary winding 48 of the transformer 45. The anode of the triode 53 is connected to the left end terminal of the transformer secondary winding 48 and the anode of the triode 54 is connected to the right end terminal of the transformer secondary winding 48. The cathodes of the triodes 53 and 54 are connected together and through a fixed resistance 82 and a conductor 83 to the terminal 32 of the motor 12. The terminal 31 of the motor 12 is connected by a conductor 84 to a center tap 85 on the transformer secondary winding 48. Thus, the triodes 53 and 54 are utilized for supplying energizing current to the phase winding 36 of motor 12.

The electronic motor drive circuit shown in Fig. 1 of the drawings and described herein for selectively controlling the operation of the reversible electrical motor 12 for rotation in one direction or the other is disclosed and is being claimed in application Serial No. 421,173 filed by W. P. Wills for Measuring apparatus on December 1, 1941. Therefore, for the present purposes it is believed sufficient to note that the motor 12 is preferably so constructed that the impedance of the winding 36 is of the proper value to match the impedance of the anode circuits of the triodes 53 and 54 when the motor is operating in order to obtain the most efficient operation. Preferably, the motor is so constructed that it has a high ratio of inductance to resistance, for example, of the order of 6–1 or of 8–1 at the frequency of the energizing current supplied to it. This provides for maximum power during the running condition of the motor with the least amount of heating, and also provides a low impedance path for braking purposes.

As noted hereinbefore, energizing current is supplied to the motor winding 37 from the alternating current supply conductors $L^1$ and $L^2$ through the condenser 35. The condenser 35 is so selected with respect to the inductance of the motor windings 37 as to provide a series resonant circuit having a unity power factor. By virtue of the series resonant circuit, the total impedance of the motor winding 37 is substantially equal to the resistance of the winding, and since this resistance is relatively low, a large current flow through the winding 37 is made possible. This permits the attainment of maximum power and torque from the motor 12. In addition, the current flow through the motor winding 37 is in phase with the voltage of the alternating current supply conductors $L^1$ and $L^2$ because of the series resonant circuit. The voltage across the motor winding 37, however, leads the current by substantially 90° because of the inductance of the winding 37.

Energizing current is supplied the motor winding 36 from the transformer secondary winding 48 through the anode circuits of the triodes 53 and 54 through the circuits previously traced. A condenser 86 is connected in parallel with the motor winding 36 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 53 and 54, and accordingly, provides efficient operation. The relatively low internal circuit impedance approximates the actual resistance of the winding 36, and since this resistance is relatively low, the impedance of the local circuit is also relatively low.

For the first half cycle of the alternating voltage produced across the terminals of the transformer secondary winding 48, the anode of the triode 53 is rendered positive with respect to the center tap 85 on the winding, and during the second half cycle, the anode of the triode 54 is rendered positive with respect to said center tap. Accordingly, the triodes 53 and 54 are arranged to conduct on alternate half cycles of the alternating current supplied by the supply conductors L¹ and L².

For the condition when the potentiometric measuring circuit 2 is balanced no voltage is induced in the transformer secondary winding 17, and therefore, the potentials of the control electrodes of the triodes 42, 43 and 51 remain substantially constant. Consequently, no signal is then impressed upon the control electrodes of the triodes 53 and 54. Under this condition of operation a pulse of unidirectional current flows from the anode of the triode 53 to the cathode thereof, and through the motor winding 36 during the first half cycle of the alternating voltage supply. During the second half cycle a pulse of current flows from the anode of the triode 54 to the cathode, and thence through the motor winding 36. Since the control electrodes of the triodes 53 and 54 are connected together, and since the potentials of these control electrodes remain substantially constant when the potentiometric measuring circuit 2 is balanced, pulses of equal magnitude flow in the anode circuits of the triodes 53 and 54 during each succeeding half cycle of the alternating voltage supplied by the transformer secondary winding 48.

From the foregoing explanation it will be noted that when the potentiometric measuring circuit 2 is balanced, pulsating unidirectional current of twice the frequency of the alternating voltage supplied by conductors L¹ and L² is impressed on the motor winding 36. When thus energized the motor 12 is not urged to rotation in either direction but remains stationary. Due to the relatively high direct current component of the current then flowing through the motor winding 36 the core structure of the motor 12 tends to become saturated whereby the inductive reactance of the motor winding 36 is relatively small. The condenser 86, in shunt to the motor winding 36 is so chosen that the condenser and motor winding then provides a parallel resonant circuit. This saturation of the core structure of the motor 12 operates to exert an appreciable damping effect on the rotor 30, or in other words, an effect tending to prevent rotation of the rotor 30. Consequently, if the rotor 30 has been rotating, saturation of the motor core structure operates to quickly stop the rotation.

Upon unbalance of the potentiometric measuring circuit 2 the magnitude of the pulses of current flowing in the anode circuit of one triode 53 or 54 will be increased while the magnitude of the pulses of current flowing in the anode circuit of the other triode will be decreased. Accordingly, the pulses of unidirectional current supplied to the motor winding 36 during the first half cycle will predominate over those supplied the motor winding during the second half cycle. Such energization of the motor winding 36 operates to introduce therein an alternating component of current of the same frequency as that supplied by the alternating current supply conductors L¹ and L². This alternating component of current will be either in phase with or 180° out of phase with the alternating current flowing through the motor winding 37 depending upon the direction of potentiometric unbalance and produces an alternating magnetic field in the motor core structure which reacts with the alternating field established by the motor winding 37 to produce a rotating field in the motor. This rotating field rotates in one direction or the other depending upon the direction of potentiometric unbalance and effects actuation of the motor rotor 30 for rotation in a corresponding direction. In addition, when the motor winding 36 is so energized the direct current component of the current flowing therein is decreased, and consequently, the saturation of the motor core structure is decreased with the result that the rotor damping effect is reduced.

In order to permit rapid operation of the reversible electrical motor 12 in effecting rebalance of the potentiometric network 2 without overshooting and consequent hunting occurring, the response of the motor 12 must be correlated with the unbalancing and rebalancing operations of the potentiometric network. This may be accomplished by adjusting the contact 81 along the resistance 80 which is employed for the purpose of coupling the triode circuit of triode 51 to the input circuits of the triodes 53 and 54. The contact 81 and resistance 80 may be termed a sensitivity adjustment. By moving the contact 81 in an upward direction the amplitude of swing of the control electrodes of the triodes 53 and 54 is increased for any given signal impressed on the input circuit of the electronic amplifier 1, and by moving the contact 81 in a downward direction the amplitude of swing is decreased. This accordingly adjusts the sensitivity of the electronic amplifier 1 whereby the response of the reversible electrical motor 12 may be exactly correlated with the operation of the potentiometric network.

Figure 2:
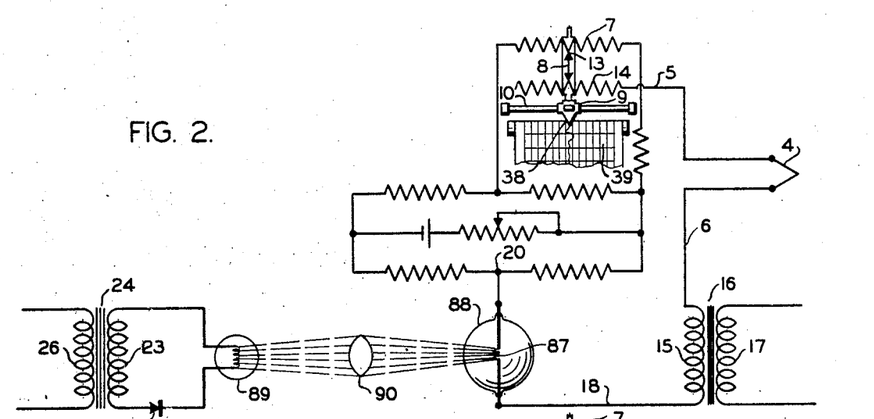
Fig. 2 illustrates a modification of the converter device utilized in the arrangement of Fig. 1.

In Fig. 2 I have illustrated more or less diagrammatically a modification of the resistive device 19 of the arrangement of Fig. 1 for converting the unbalanced potentiometric direct currents into an alternating current of one phase or of opposite phase in the transformer secondary winding 17 depending upon the polarity of the unbalanced potentiometric currents. The elements of the arrangement of Fig. 2 may be identical to the correspondingly identified parts of Fig. 1.

In the arrangement disclosed by Fig. 2, the unbalanced potentiometric direct currents are passed through a coiled filament 87 which is supported within a container 88 and is arranged so as to be subjected to the illumination of a lamp 89. The coil 87 is preferably composed of extremely fine wire having very small mass so as permit rapid fluctuation in the temperature thereof and has an appreciable temperature coefficient of resistance whereby variations in the temperature thereof produce corresponding variations in its resistance.

Lamp 89 is connected to the terminals of the secondary winding 23 of the transformer 24 through a copper oxide rectifier 25. Thus, the lamp 89 is arranged to be energized with pulsating direct current of the same frequency as the frequency of the alternating current supplied by the conductors L¹ and L². Desirably, the filament of lamp 89 is so constructed as to have a very small mass whereby the temperature of the filament of the lamp and consequently the illumination therefrom may be varied at the frequency of the pulses of current passed through the filament. A collimating lens 90 is provided for focussing the light given off by lamp 89 on the filament 87, and in order to permit efficient conversion of the unbalanced potentiometric direct currents into an alternating current which may be readily amplified, the filament 87 is desirably so constructed as to present a relatively small area compared to the size of the filament of lamp 89. In this manner the light given off by the relatively large surface of the filament of lamp 89 may be focussed on the relatively small area of the filament 87 to the end that greater temperature variation of the filament 87 may be produced. In addition this desired effect may be enhanced by providing a suitably curved mirror behind the coiled filament 87 to reflect heat variations which have passed through the coil 87 back on the latter. By placing the mirror some distance from the coil 87 the ambient temperature of the mirror will have little or no effect on the temperature of the coil 87.

In this modification, by virtue of the action of the rectifier 25, the lamp 89 has impressed thereon a pulsating unidirectional current having the same frequency as that of the alternating current supply lines $L^1$ and $L^2$. These pulses of current through the filament of lamp 89 cause the lamp 89 to emit a pulsating light of the same frequency as that of the energizing current, which pulsating light is focussed on the filament 87. The heat energy of the pulsating light falling on the filament 87 operates to vary the temperature of the filament 87 at the frequency of the pulses of light and thus produce corresponding variations in resistance of the filament 87. These variations in resistance of the filament 87 effectively interrupt the unbalanced potentiometric direct curents impressed on the transformer primary winding 15 at the frequency of the current supplied by the alternating current supply lines $L^1$ and $L^2$, and consequently, cause the induction of an alternating voltage in the transformer secondary winding 17 of one phase or of opposite phase depending upon the polarity of the unbalanced potentiometric direct currents.

The alternating current so derived in the transformer secondary winding 17 may be amplified by the electronic device 1 of the arrangement shown in Fig. 1 and the amplified quantity may be utilized for controlling the selective actuation of the reversible electrical motor 12 for effecting rebalance of the potentiometric circuit 2 in the manner explained in connection with Fig. 1.

Figure 3:
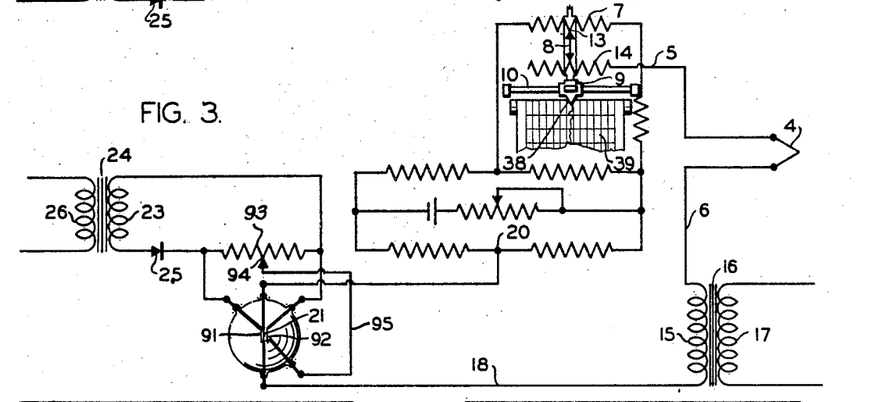
Fig. 3 illustrates a preferred form of converter device which may be utilized in the arrangement of Fig. 1.

In Fig. 3 I have illustrated more or less diagrammatically another modification of the resistive device 19 of the arrangement of Fig. 1 for converting the unbalanced potentiometric direct currents into an alternating current which may be readily amplified and utilized for controlling the selective actuation of a reversible electrical motor for rebalancing the potentiometric measuring circuit 2. At this point it may be noted that the arrangement of Fig. 1 is subject to a disadvantage which is overcome by means of the arrangement of Fig. 3. Since pulsating direct current flows through the heater filament 22 of the arrangement of Fig. 1 and this heater filament is disposed closely adjacent the filament 21, it is possible for alternating currents to be induced in the filament 21 from the heater filament 22 due to transformer effect or electrical coupling between the filaments 21 and 22. Such induced alternating currents in the filament 21 will be amplified by the electronic amplifier 1 and thus affect the operation of the reversible electrical motor. Such action obviously is undesired in that it reduces the accuracy of the instrument. As noted above this disadvantage is overcome by means of the arrangement of Fig. 3.

The resistive device in the arrangement of Fig. 3 is generally like the resistive device 19 of Fig. 1 but differs therefrom in that two heater filaments 91 and 92 are disposed closely adjacent the heater filament 21 for producing variations in temperature of the latter and thereby variations in its resistance and a slidewire resistance 93 is provided for equalizing the current in the heater filaments 91 and 92 and for simultaneously passing currents therethrough in opposite directions to neutralize or eliminate inductive coupling between the heater filaments 91 and 92 and the filament 21. With this arrangement, any tendency for an alternating voltage to be induced in the filament 21 by virtue of electrical coupling between the filament 21 and the filament 91 is eliminated or cancelled out by the tendency of an alternating voltage of the opposite phase to be induced in the filament 21 from the heater filament 92. Such neutralization of the inductive coupling effects between the heater filaments 91 and 92 and the filament 21 may be effected to a high degree of accuracy by adjusting the position of a contact 94 along the length of the slidewise resistance 93.

In particular, the end terminals of the slidewire resistance 93 are connected to the terminals of the transformer secondary winding 23 through a copper oxide rectifier 25. The contact 94 is connected by a conductor 95 to a common terminal of the heater filaments 91 and 92. The other terminal of the heater filament 91 is connected to one end terminal of the resistance 93 and the other terminal of the heater filament 92 is connected to the other end terminal of the resistance 93. Thus, on the assumption pulsating unidirectional current flows from left to right through the slidewire resistance 93, as seen in the drawings, a pulse of current will flow from the left terminal of the resistance 93 downwardly through the heater filament 91 and through the conductor 95 to the contact 94. Simultaneously, a pulse of current will flow from the contact 94 through the conductor 95 and upwardly through the heater filament 92 to the right end terminal of the slidewire resistance 93. The electrical field established about the heater filament 91 by the downward pulse of current therethrough is cancelled out by the electrical field established about the heater filament 92 by the upward pulse of current therethrough, and consequently, the tendency for an alternating current to be induced in the filament 21 by electrically coupling from the heater filaments 91 and 92 is eliminated. As pointed out this operates to increase the accuracy of the instrument.

It will be understood that, if desired, the heater filaments 91 and 92 may be wound in the form of coils instead of being straight filaments as shown in the drawings, as may also the filament 21. When the heater filaments 91 and 92 and the filament 21 are constructed in the form of coils, the coils 91 and 92 are preferably non-inductively wound with respect to the filament 21.

Figure 4:
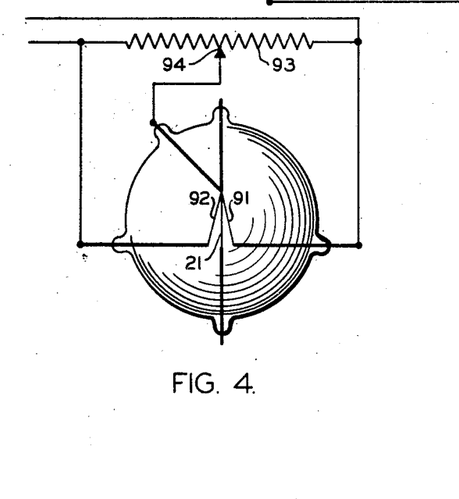
Figs. 4 and 5 illustrate additional modifications of the converter device of Fig. 1.

In Fig. 4 I have illustrated more or less diagrammatically a modification of the resistive device of the arrangement of Fig. 3 for converting the unbalanced potentiometric direct currents into an alternating current which may be readily amplified and utilized for controlling the selective operation of the reversible electrical motor 12. The arrangement of Fig. 4 is exactly like the arrangement of Fig. 3 with the exception that the common terminal of the filaments 91 and 92 is electrically connected to the upper end of the filament 21 as illustrated. The operation of this modification of my invention otherwise is exactly like the arrangement of Fig. 3. Although the common terminal of the heater filaments 91 and 92 are connected to one end of the filament 21, no current from the slidewire resistance 93 passes through the filament 21, and therefore, the filament 21 is not influenced directly by such current but only indirectly as a result of the heating effect thereon of the heater filaments 91 and 92.

Figure 5:
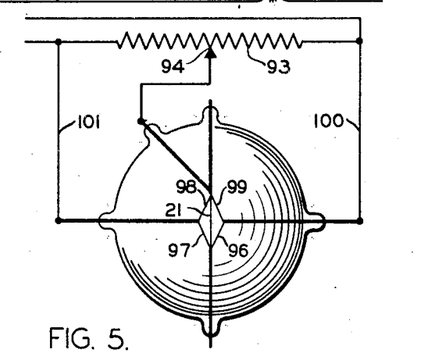

In Fig. 5 I have illustrated a further modification of the resistive device of the arrangement of Fig. 3 for converting the potentiometric unbalanced direct currents into an alternating current. The converter arrangement of Fig. 5 is generally like the converter arrangement of Fig. 3 but differs therefrom in that four heater filaments 96, 97, 98 and 99 are utilized for producing rapid temperature variations of the filament 21. The heater filaments 96, 97, 98 and 99 are disposed closely adjacent the filament 21 and are connected in the form of a bridge. Specifically, one end of each of the heater filaments 96 and 97 is connected to the lower terminal of the filament 21. Similarly, one end of each of the heater filaments 98 and 99 are connected to the upper terminal of the filament 21. The other terminals of the heater filaments 96 and 99 are connected together and through a conductor 100 to the right end terminal of the slidewire resistance 93. The other terminals of the heater filaments 97 and 98 are connected together and are connected through a conductor 101 to the left end terminal of the slidewire resistance 93.

With this arrangement, on the assumption that the pulsating direct current through the resistance 93 flows through the latter from left to right, a pulse of current flows from the left end terminal of the resistance 93 through the conductor 101 to the common terminal of heater filaments 97 and 98. The pulse of current then divides, part going through the heater filament 97 and part through the heater filament 98. The current flow through the heater filament 97 then passes through the heater filament 96 and the current flow through the heater filament 98 passes through the heater filament 99. These two current flows then combine at the common terminal of the heater filaments 96 and 99 and are conducted by the conductor 100 to the right end terminal of the resistance 93. In addition current flows through the heater filaments 98 and 99 through the contact 94 and conductor 95. The heater filaments 96, 97, 98 and 99 are so chosen and the contact 94 is so adjusted along resistance 93 that the potential drop across the heater filament 96 is exactly the same as the potential drop across the heater filament 99. The potential drop across the heater filament 97 is exactly the same as that across the heater filament 98. Therefore, the potentials at the opposite ends of the filament 21, when the potentiometric measuring circuit 2 is balanced, are exactly the same, and it is noted that the pulsating direct current flow through the heater filaments 96, 97, 98 and 99 do not affect the filament 21 in any way except through the action of the pulsating current in heating the filaments 96, 97, 98 and 99 and the heat from the latter operating to change the temperature of the filament 21.

This modification of my invention also accomplishes the desirable result of cancelling out the effect of the electrical coupling between the heater filaments 96, 97, 98 and 99 and the filament 21 to the end that the induction of alternating currents in the filament 21 from the heater filaments is eliminated.

As will be understood by those skilled in the art, the rectifier 25 provided in each of the arrangements described may be dispensed with if the primary winding 26 of the transformer 24 is energized with alternating current of a frequency one-half that of the alternating current which is supplied to the primary winding 46 of the transformer 45. By utilizing alternating current of a frequency reduced to this extent for energizing the heater filaments arranged to heat the filament 21 in the arrangements of Figs. 1, 3, 4 and 5 or the heater filament 87 of Fig. 2, the temperature of the filaments 21 or 87 will be varied at the frequency of the alternating current supplied to the transformer primary winding 46, and consequently, the frequency of the alternating voltage derived in the transformer secondary winding 17 will be of the same frequency as the alternating current supplied to the transformer primary winding 46. When the heater filaments of the converter devices are so energized it is necessary to properly phase the alternating current of reduced frequency to that of the higher frequency alternating current so that the induced alternating voltage in the transformer secondary winding 17 will be either in phase with or 180° out of phase with that supplied the transformer primary winding 46.

It will be apparent that the reversible electrical motor 12 may be employed to operate a valve 102 positioned in the fuel supply pipe 103 for varying the supply of heating agent to the furnace 3, to the temperature of which the thermocouple 4 is responsive, or preferably a separate reversible electrical motor may be so employed. For example, as disclosed in the drawings a reversible electrical motor 104 having two opposed field windings (not shown) may be utilized for this purpose. The reversible motor 104 is mechanically connected in any suitable manner to the valve 102 and is adapted to adjust the latter to its open and closed positions depending upon the direction the reversible motor 104 is energized for rotation. The mechanical connection of the motor 104 to the valve 102 is such as to increase or decrease the supply of heating agent to the furnace 3 as the temperature of the latter falls below or rises above a predetermined level.

The motor 104 is energized for rotation in one direction or the other depending upon which of the two opposed field windings is energized by means of a switch 105. The switch 105 includes a contact 106 which is carried by the carriage 9 and is disposed in operative relation with a pair of elongated contact segments 107 and 108. The contact segments 107 and 108 are insulated from each other and from the contact 106 and are disposed end to end along the slidewire resistance 7 of the potentiometric measuring circuit. The adjacent ends of the contact segments 107 and 108 are separated by a suitable distance and are so related to the slidewire resistance 7 that when the contact 106 is intermediate the segments 107 and 108 and out of engagement with both, the temperature within the furnace 3 will be at the desired control point. The switch contact 106 is insulated from the slidewire resistance 7 and also from the carriage 9.

The switch contact 106 is connected to the alternating current supply conductor L¹ and the common terminal of the opposed windings of motor 104 is connected to the supply conductor L². The contact segment 107 is connected by a conductor 109 to the other terminal of one of the opposed motor field windings and the contact segment 108 is connected by a conductor 110 to the other terminal of the other motor field winding. Thus, upon engagement of the contact 106 with the contact segment 107, one of the windings of motor 104 is energized and actuates the motor for rotation in one direction, and upon engagement of the contact 106 with the contact segment 108, the other of the windings of motor 104 is energized and actuates the motor for rotation in the opposite direction.

Although not shown the contact segments 107 and 108 of the switch 105 are desirably made adjustable so that both the control point setting and sensitivity of the apparatus may be adjusted in a manner well known in the art.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention what I claim as new and desire to secure by Letters Patent is:

1. The combination with a circuit including a resistive filament having an appreciable temperature coefficient of resistance, of means for impressing a small unidirectional electromotive force on said circuit, a pair of heater filaments disposed closely adjacent said resistive filament for heating the latter, a source of fluctuating current for energizing said heater filaments for varying the temperature of the resistive filament in correspondence with the fluctuations of said current and thereby for subjecting said resistive filament to a source of heat regularly varying in temperature to cause said resistive filament to regularly vary in resistance whereby said unidirectional electromotive force creates a pulsating current flow in said circuit, and means for impressing current on said heater filaments from said source in such manner that the electrical field established by one of said heater filaments is cancelled by the electrical field established by the other of said heater filaments whereby the electrical coupling between said heater filaments and said resistive filament is neutralized.

2. The combination with a circuit including a resistive filament having an appreciable temperature coefficient of resistance, of means for impressing a small unidirectional electromotive force on said circuit, a pair of heater filaments disposed closely adjacent said resistive filament for heating the latter, a bridge circuit including said heater filaments in two adjacent arms thereof and a resistance having a contact adjustable along the length thereof in the two remaining arms thereof, a connection between the common terminal of said heater filaments and said contact, a source of fluctuating current, and means to impress said source of fluctuating current across the terminals of said resistance.

3. The combination with a circuit including a resistive filament having an appreciable temperature coefficient of resistance, of means for impressing a small unidirectional electromotive force on said circuit, a pair of heater filaments disposed closely adjacent said resistive filament for heating the latter, a bridge circuit including said heater filaments in two adjacent arms thereof and a resistance having a contact adjustable along the length thereof in the two remaining arms thereof, a connection between the common terminal of said heater filaments and said contact, a source of fluctuating current, and means to impress said source of fluctuating current across the terminals of said resistance, said heater filaments being so arranged relatively to said resistive filament that the electrical field established by one heater filament neutralizes the electrical field established by the other heater element.

4. The combination with a circuit including a resistive filament having an appreciable temperature coefficient of resistance, of means for impressing a small unidirectional electromotive force on said circuit, four heater filaments disposed closely adjacent said resistive filament for heating the latter, said heater filaments each being arranged in a different arm of a bridge circuit having said resistive filament connected between the equi-potential points thereof, a resistance having a contact adjustable along the length thereof, a connection from one end of said resistance to a third terminal of said bridge circuit and a connection from the other end of said resistance to a fourth terminal of said bridge circuit, a source of fluctuating current, a connection from said contact to one end of said resistive filament, and means for impressing said source of fluctuating current on the terminals of said resistance.

5. In a measuring instrument, the combination of an adjustable potentiometer device, means to produce unbalanced current in said potentiometer device, means to convert the unbalanced potentiometer current into varying current of uniform frequency, said last mentioned means including a resistive filament having an appreciable temperature coefficient of resistance through which the unbalanced portion of the potentiometer current is passed, a pair of heater filaments disposed closely adjacent said resistive filament for heating the latter, a source of fluctuating current of the same frequency as said varying current for energizing said heater filaments to vary the temperature of the resistive filament in correspondence with the fluctuations of said current and thereby to subject said resistive filament to a source of heat regularly varying in temperature to cause said resistive filament to regularly vary in resistance, and means for impressing current on said heater filaments from said source in such manner that the electrical field established by one of said heater filaments is cancelled by the electrical field established by the other of said heater filaments whereby the electrical coupling between said heater filaments and said resistive filament is neutralized, a reversible rotatable motor to adjust said potentiometer device to reduce said unbalanced potentiometer current, and motor control means controlled by the varying current of uniform frequency produced by said converting means.

6. In a measuring instrument, the combination of an adjustable potentiometer device, means to produce unbalanced current in said potentiometer device, means to convert the unbalanced potentiometer current into varying current of uniform frequency, said last mentioned means including a resistive filament having an appreciable temperature coefficient of resistance through which the unbalanced portion of the potentiometer current is passed, a pair of heater filaments disposed closely adjacent said resistive filament for heating the latter, a bridge circuit including said heater filaments in two adjacent arms thereof and a resistance having a contact adjustable along the length thereof in the two remaining arms thereof, a connection between the common terminal of said heater filaments and said contact, a source of fluctuating current of the same frequency as said varying current, and means to impress said source of fluctuating current across the terminals of said resistance, a reversible rotatable motor to adjust said potentiometer device to reduce said unbalanced potentiometer current, and motor control means controlled by the varying current of uniform frequency produced by said converting means.

7. In a measuring instrument, the combination of an adjustable potentiometer device, means to produce unbalanced current in said potentiometer device, means to convert the unbalanced potentiometer current into varying current of uniform frequency, said last mentioned means including a resistive filament having an appreciable temperature coefficient of resistance through which the unbalanced portion of the potentiometer current is passed, four heater filaments disposed closely adjacent said resistive filament for heating the latter, said heater filaments each being arranged in a different arm of a bridge circuit having said resistive filament connected between the balancing potential points thereof, a resistance having a contact adjustable along the length thereof, a connection from one end of said resistance to a third terminal of said bridge circuit and a connection from the other end of said resistance to a fourth terminal of said bridge circuit, a connection from said contact to one end of said resistive filament, a source of fluctuating current of the same frequency as said varying current, and means for impressing said source of fluctuating current on the terminals of said resistance, a reversible rotatable motor to adjust said potentiometer device to reduce said unbalanced potentiometer current, and motor control means controlled by the varying current of uniform frequency produced by said converting means.

8. The combination with a circuit including a resistive filament having an appreciable temperature coefficient of resistance, said resistive filament being provided with terminals of high thermal conductivity and arranged within a container filled with a gas having a high thermal conductivity to facilitate conduction of heat away from said filament, of means for impressing a small unidirectional electromotive force on said circuit, and means for continuously subjecting said resistive filament to a source of heat regularly varying in temperature whereby said electromotive force creates a pulsating current flow in said circuit of a frequency corresponding to the frequency of variation of said heat source.

FREDERICK W. SIDE.